United States Patent
Davies et al.

(10) Patent No.: US 11,762,888 B2
(45) Date of Patent: Sep. 19, 2023

(54) GEOLOGICAL DATABASE MANAGEMENT USING SIGNATURES FOR HYDROCARBON EXPLORATION

(71) Applicant: Landmark Graphics Corporation, Houston, TX (US)

(72) Inventors: Andrew Davies, West Hagbourne (GB); Mike Derek Simmons, Wantage (GB); Michael Charles Quintrell Treloar, Wantage (GB); James Iain Scotchman, Didcot (GB); Owen Edward Sutcliffe, Stevenson (GB)

(73) Assignee: Landmark Graphics Corporation, Houston, TX (US)

(*) Notice: Subject to any disclaimer, the term of this patent is extended or adjusted under 35 U.S.C. 154(b) by 513 days.

(21) Appl. No.: 17/123,908

(22) Filed: Dec. 16, 2020

(65) Prior Publication Data
US 2022/0188338 A1    Jun. 16, 2022

(51) Int. Cl.
*G06F 16/00* (2019.01)
*G06F 16/29* (2019.01)
(Continued)

(52) U.S. Cl.
CPC ............ *G06F 16/29* (2019.01); *G01V 99/005* (2013.01); *G06T 17/05* (2013.01)

(58) Field of Classification Search
CPC ...... G06F 16/29; G06F 18/22; G06F 2218/08; G01V 99/005; G06T 17/05
See application file for complete search history.

(56) References Cited

U.S. PATENT DOCUMENTS

| | | |
|---|---|---|
| 2010/0030527 A1 | 2/2010 | Prasad et al. |
| 2011/0118983 A1 | 5/2011 | Rowan |

(Continued)

FOREIGN PATENT DOCUMENTS

| | | |
|---|---|---|
| EP | 2819086 | 12/2014 |
| WO | 2009145960 | 12/2009 |

OTHER PUBLICATIONS

C&C Reservoirs, "Analogue Intelligence for Better Decision-Making", 2020, 4 pages.
(Continued)

*Primary Examiner* — Ian Jen
(74) *Attorney, Agent, or Firm* — Kilpatrick Townsend & Stockton LLP

(57) ABSTRACT

A system is described for determining an analogue geological feature. The system may include a processor and a non-transitory computer-readable medium comprising instructions that are executable by the processor to cause the processor to perform various operations. The system may generate, by extracting parameter signatures for geological features, a database including parameters about geological features associated with parameter signatures. The system may receive data including parameters and a feature-type about a geological feature of interest. The system may generate a signature including values for a subset of the feature-of-interest parameters selected based on the geological feature of interest for the feature-of-interest using the data. The system may execute a comparison of the feature signature to the parameter signatures included in the database for identifying an analogue geological feature for the feature of interest. The system may output a subset of parameters for the analogue for use in subterranean exploration.

20 Claims, 7 Drawing Sheets

(51) Int. Cl.
*G06T 17/05* (2011.01)
*G01V 99/00* (2009.01)

(56) References Cited

U.S. PATENT DOCUMENTS

| | | |
|---|---|---|
| 2012/0001916 A1 | 1/2012 | Majors et al. |
| 2018/0156934 A1 | 6/2018 | Strang |
| 2020/0165913 A1 | 5/2020 | Benson et al. |
| 2020/0183044 A1* | 6/2020 | Doronichev ............. G01V 5/12 |

OTHER PUBLICATIONS

CGG, "Robertson Analogues", 2020, 2 pages.
Demyanov et al., "Uncertainty Quantification in Reservoir Prediction: Part 2—Handling Uncertainty in the Geological Scenario", Jul. 19, 2018, 24 pages.
PDS AVA, "Reduce Uncertainty in Geomodelling", 2019, 4 pages.
Safari DB, "The Geological Outcrop Database", 2010-2020, 8 pages.
PCT/US2020/066143, "International Search Report and Written Opinion", dated Sep. 8, 2021, 8 pages.

* cited by examiner

US 11,762,888 B2

GEOLOGICAL DATABASE MANAGEMENT USING SIGNATURES FOR HYDROCARBON EXPLORATION

TECHNICAL FIELD

The present disclosure relates generally to hydrocarbon exploration using database management and, more particularly (although not necessarily exclusively), to managing geological databases using signatures for hydrocarbon exploration.

BACKGROUND

Hydrocarbon exploration can use surface measurements to provide some information about a subterranean formation. Using analogous formations to the formation-of-interest can provide further information since more information is available for the analogous formations and that information may be used to model the formation-of-interest. But finding and selecting an analogous formation can be challenging. Information about potential analogous formations may be stored in a database. Data about the formation-of-interest may be limited, and the information that is available may not allow for the database to be searched quickly or even successfully. For example, a Boolean search may be performed and reveal formations that are potentially analogous based on the search, but the formations may not be similar to the formation-of-interest even though one or more data elements are the same or similar based on the search. Due to geological and petrophysical complexities represented by data, matching a best analogous formation of interest via a multi-parameter search is time intensive and computationally demanding.

DETAILED DESCRIPTION

Figure 1:
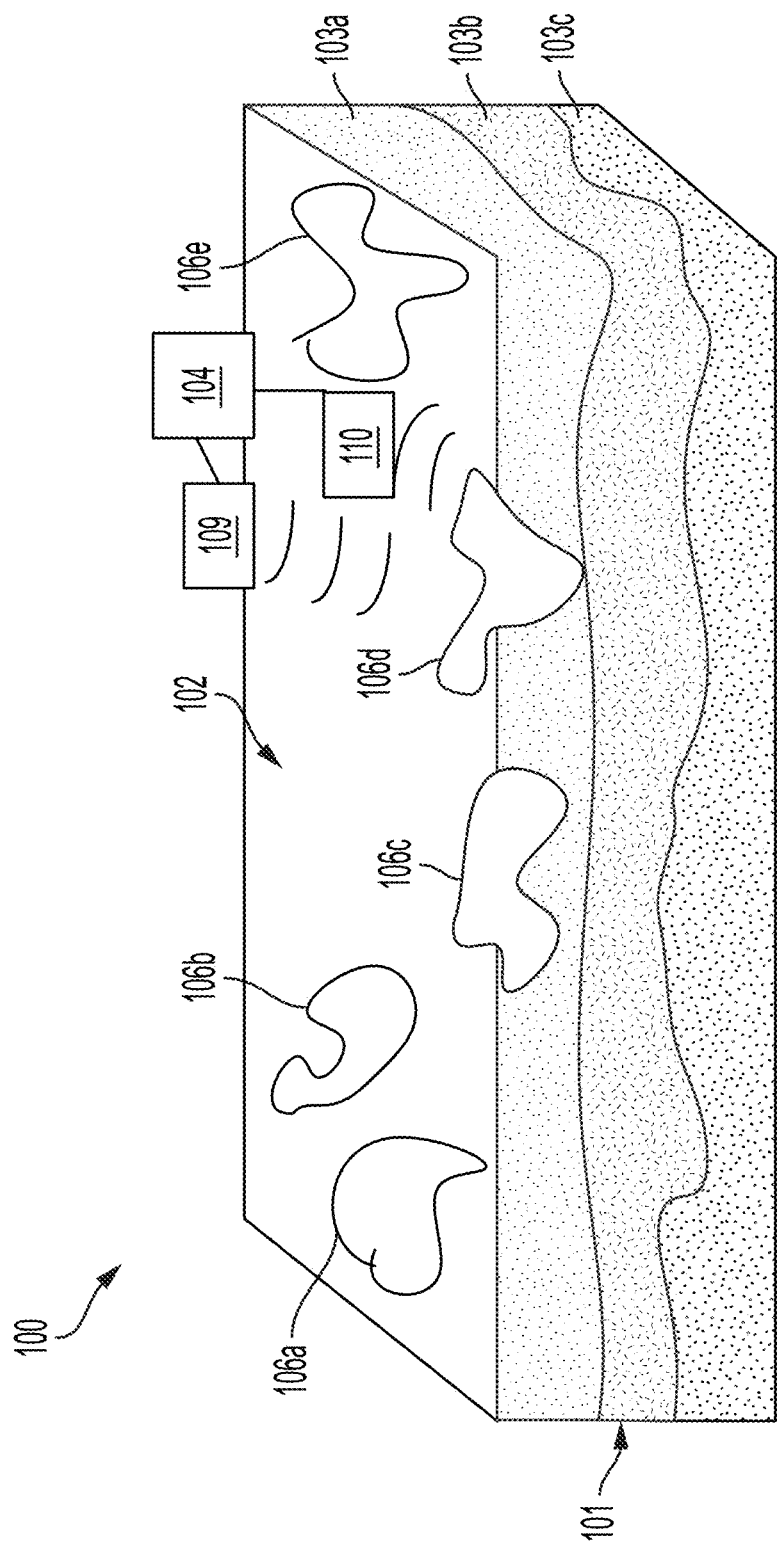
FIG. 1 is a diagram of a subterranean formation having at least one geological feature of interest that can be modeled with information from an analogue geological feature according to one example of the present disclosure.

Certain aspects and examples of the present disclosure relate to configuring a geological database for allowing a signature of a geological feature of interest to be used for determining an analogue geological feature for use in subterranean exploration. The geological feature of interest may be included in a subterranean formation and may include feature types such as a subterranean reservoir, a rock basin, and the like. In some examples, the geological feature of interest may be the subterranean formation. The geological feature of interest may alternatively be offshore and included in a sub-oceanic formation. The signature of the geological feature of interest can be a parameter space that includes parameters extracted from the geological feature of interest. The extracted parameters may include wave energy, tidal energy, transport distance, amount of sediment, and other suitable parameters for describing the geological feature of interest. The geological database may include data about a set of geological features, and the data may include parameter types similar or identical to the extracted parameters of the geological feature of interest. At least one of the geological features in the geological database may be the analogue geological feature. The analogue geological feature may include a signature similar or identical to the signature of the geological feature of interest. The signature may include the extracted parameters, and a subset of the extracted parameters may be used to search the geological database, and the search may output the subset of the extracted parameters of the analogue geological feature and additional parameters of the analogue geological feature. The extracted parameters and the additional parameters of the analogue geological feature may be subsequently used for subterranean exploration operations.

Information relating to the subsurface may be incomplete, and challenges for successful subterranean or hydrocarbon exploration and production may exist due to the incomplete information relating to the subsurface. While seismic data may be relatively extensive in its geographical coverage, the seismic data may not resolve more than broad stratigraphic features. Well, core, and outcrop data can provide high resolution constraint, but the data may be sparsely distributed. As such, problems can occur when trying to model subsurface properties. It may be desirable to draw on suitable analogue geological features. Such analogues can be used to inform decisions at a basin-scale, play-scale, or reservoir-scale and, in some examples, an analogue should be the analogue geological feature that formed under geological conditions most similar to the geological feature of interest. But, determining which geological feature is the analogue can be challenging and selection of the analogue can be biased.

To address this challenge, a contextual geological database can be used to assist in identifying suitable analogues. The contextual database may provide quantitative information on a range of physical processes occurring in the geological past. The processes, such as subsidence rate, wave energy, eustasy, and the like, can be key controls on numerous factors including basin prospectivity, play characteristics, and reservoir properties. The parameters controlling the geological feature of interest can be extracted from the contextual database. A parameter space, or signature, of the geological feature of interest can be compared against the parameter space of the geological database, which may allow the analogue geological feature to be identified. The identification can be manual or automated. Statistical information from the selected analogue, such as lateral and vertical changes in sedimentary properties, can subsequently be used to generate subsurface models and for other tasks relating to subterranean exploration. Using quantitative information for a range of processes, such as subsidence rate, wave energy, and eustasy, for characterizing parameter spaces of geological features of interest and an analogue geological feature may allow direct comparisons using unsupervised machine learning to identify the analogue geological feature. Users may be able to more easily create robust, geologically-sensible reservoir models for exploration operations.

A geological database may be generated that includes a parameter space for each potentially analogue geological feature pre-extracted. The parameters can include a range of physical processes having influence on sedimentary systems. The list of parameters needed may differ depending on what the geological feature of interest is, such as a deltaic reservoir, a carbonate reservoir, regional source rock, and the like. The parameters can additionally or alternatively include processes such as the energy of waves and tides that may control porosity and permeability of sediments, eustatic changes and subsidence rates that may influence sediment heterogeneity, the magnitude of oceanic currents that may influence organic carbon content, and climate in a drainage basin from where the sediments were transported. Some aspects of the subsurface may include a temporal control, such as the nature of carbonate systems. The parameters may therefore be derived from different sources including observations such as measuring subsidence rates, modelling such as climate models, and data processing such as paleobathymetry. Modern analogues may additionally or alternatively be used where the parameter space is derived through direct measurement. To reduce the number of parameters used, the information can be pre-processed into a single feature. For example, carbonates producers may be prone to environmental stress from a range of factors including temperature, salinity, and seawater turbidity. In this example, a single "carbonate stress" parameter can be used. The combined parameter spaces, or signatures, can be generated in various manners including the use of machine learning.

With the geological database in place, a geological feature of interest may be located geographically and temporally. Other information relating to a type of analogue may be input by a user. For example, the user may be assessing basin prospectivity and want an analogue geological feature for the source rock in the basin. Further, the user may want an analogue for a reservoir in an undrilled prospect to build a geological reasonable reservoir model to assess volumetrics. The relevant parameters can be automatically determined for characterizing the geological feature of interest and finding the analogues.

The parameter space of the feature of interest may be determined by extracting the parameter values at a location and time of the geological feature of interest. A palinspastic, or time of deposition, position may be reconstructed for the geological feature of interest. The parameter space, or signature, of the geological feature of interest can be compared against the geological features in the geological database for identifying or otherwise determining the analogue feature of interest. In some examples, more than one analogue geological feature or no analogue geological feature may be identified. The selection of the analogue geological feature can be done manually or automatically using techniques such as unsupervised machine learning. Feature engineering can be used to ensure the influence that different parameters have on the depositional architecture is adequately reflected.

Characteristics of the source rock analogue can be analyzed for determining basin prospectivity or for using information on the lateral and vertical heterogeneities in the analogue outcrop to populate a geo-statistical model to create superior reservoir models. In other examples, in addition to reservoirs, analogue geological features for play analysis and basin screening can be identified or otherwise determined. For example, in basin screening, a user may want to assess the possible quality and effectiveness of a frontier source rock. The parameter space, or signature, of possible source rock can be determined for the reservoir, using predictive models and measurements such as upwelling intensity, paleo-water depth, subsidence rates, and the like. The potential source rock can then be compared to the parameter space, or signature, of known source rocks to identify the analogue that can help the user ascertain whether the source rock is viable. Additionally, a predefined grid may be used. For example, alternative to using an aerial extent of the geological feature of interest, the world could be split into one-degree cells and the mean values within each cell may be used to find the analogue geological feature. The predefined grid may be more appropriate in a basin screening approach.

FIG. 1 is a cross-sectional, side-view of a subterranean formation 100 having a set of geological features 106a-e that can include at least one geological feature of interest that can be modeled with information from an analogue geological feature according to one example of the present disclosure. The subterranean formation 100 may include an underground region 101 and a surface region 102. The underground region 101 may be formed of various strata 103a-c that include different materials (e.g., rock, soil, oil, water, or gas) and vary in thickness and shape. The geological features 106a-e may be included in the strata 103 and may include hydrocarbon material or other suitable material.

At least one sensor 110, and at least one transmitter 109 may be communicatively coupled to a computing device 104 that, as illustrated, is positioned at the surface 102. The transmitter 109 may transmit signals into the subterranean formation 100 for determining parameters about the geological features 106. The sensor 110 may receive, or otherwise detect, signals that bounce or otherwise reflect off of the geological features 106. The sensor 110 may transmit the received signals to the computing device 104 for storing in a geological database for subsequent use. The computing device 104 can be positioned at the surface 102 of the subterranean formation 100 or elsewhere (e.g., offsite). The computing device 104 may be in communication with the drill strings, the sensor 110, or other electronic devices used for exploration. For example, the computing device 104 can include a communication interface, or be communicatively coupled to a communications device, for transmitting information to and receiving information from another communication interface of an exploration subsystem. The geological database may include data about the geological features 106 such as tide and wave energy, eustatic changes, subsidence rates, oceanic current magnitude, climate, and the like. The computing device 104 may be configured to perform a search of the geological database using a subset of parameters of a geological feature of interest for determining an analogue geological feature and outputting the subset of parameters and additional parameters of the analogue geological feature for use in exploration.

The computing device 104 may be communicatively coupled to the transmitter 109 and to the sensor 110. Although one computing device 104 is depicted in FIG. 1, in other examples, more than one computing device can be used, and, together, the multiple computing devices can perform operations such as those described in the present disclosure. The computing device 104 is depicted as being positioned at the surface 102, but, in other examples, the computing device 104 can be positioned belowground, aboveground, onsite, in a vehicle, offsite, etc.

In some examples, the computing device 104 can include a communication device. The communication device can represent one or more of any components that facilitate a network connection. For example, the communications device can allow the computing device 104 to interface with other devices via a wired connection. But, in other examples, the communication device can allow the computing device 104 to interface with other devices wirelessly and can include wireless interfaces such as IEEE 802.11, Bluetooth™, or radio interfaces for accessing cellular telephone networks (e.g., transceiver/antenna for accessing a CDMA, GSM, UMTS, or other mobile communications network). In some examples, the communication device can use acoustic waves, surface waves, vibrations, optical waves, or induction (e.g., magnetic induction) for engaging in wireless communications. In an example in which the communication device is wired, the communications device can include interfaces such as Ethernet, USB, IEEE 1394, or a fiber optic interface. In an example with at least one other computing device, the computing device 104 can receive wired or wireless communications from the other computing device and perform one or more tasks based on the communications.

In some examples, alternative to the computing device 104 performing the search of the geological database using the subset of parameters of the geological feature of interest, the computing device 104 may transmit the subset of parameters to an offsite facility (not shown) for performing the database search. In this example, the offsite facility may transmit the subset of parameters and additional parameters of the analogue geological feature to the computing device 104. In response to determining or receiving the subset of parameters and additional parameters of the analogue geological feature, the computing device 104 may output the subset of parameters and additional parameters of the analogue geological feature. The output may be displayed by the computing device 104 for viewing by an operator, or a supervisor, of the operation. The output subset of parameters and additional parameters of the analogue geological feature may be used to model the geological feature of interest or for performing other tasks related to exploration of the subterranean formation 100.

Figure 2:
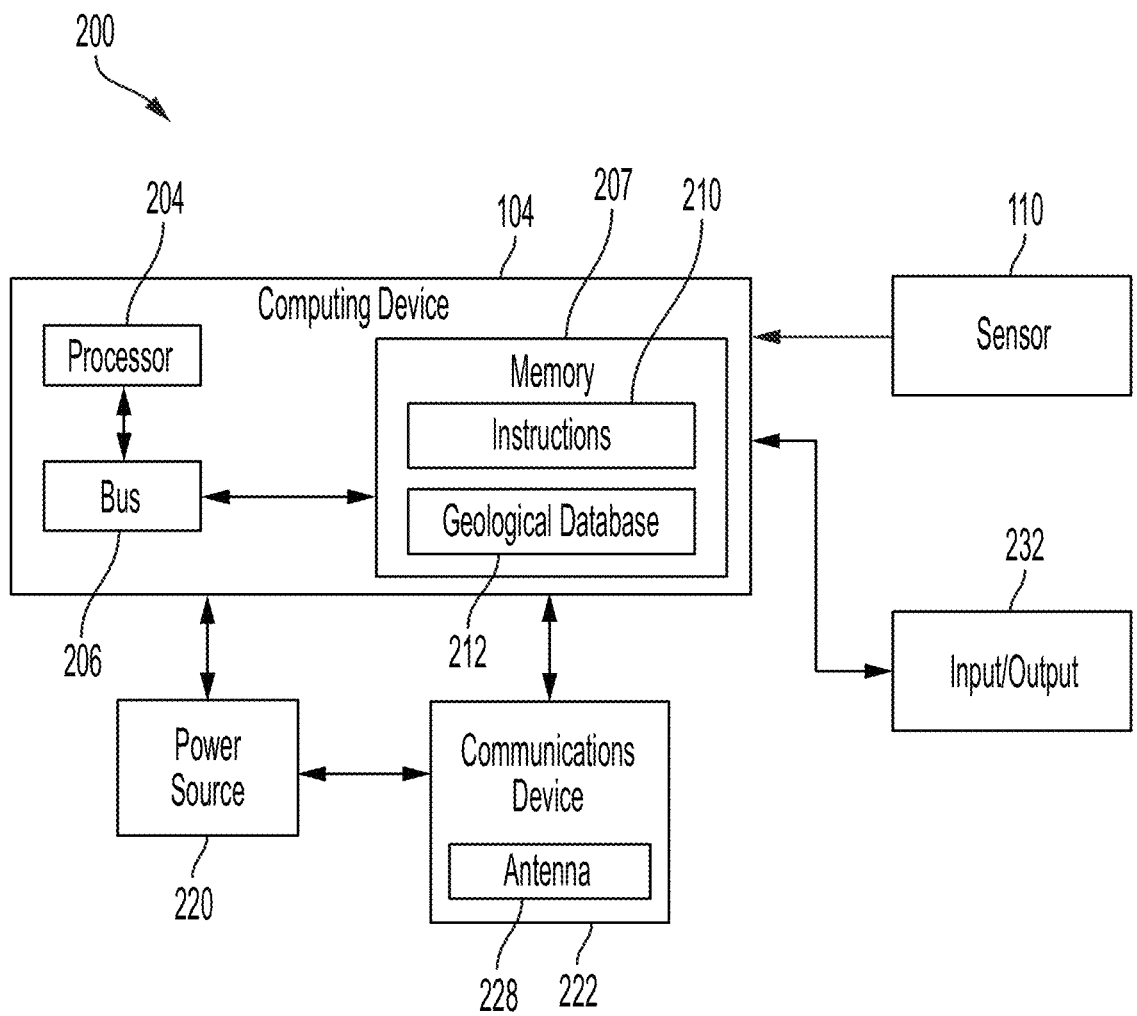
FIG. 2 is a block diagram of a computing system for outputting an analogue geological feature based on a database search with a signature of a geological feature of interest according to one example of the present disclosure.

FIG. 2 is a block diagram of a computing system 200 for outputting an analogue geological feature based on a database search with a signature of a geological feature of interest according to one example of the present disclosure. In some examples, the components shown in FIG. 2 (e.g. the computing device 140, power source 220, and communications device 222, etc.) can be integrated into a single structure. For example, the components can be within a single housing. In other examples, the components shown in FIG. 2 can be distributed via separate housings or otherwise, and in electrical communication with each other.

The system 200 may include the computing device 104. The computing device 104 can include a processor 204, a memory 207, and a bus 206. The processor 204 can execute one or more operations for outputting the analogue geological feature for use in a subterranean exploration operation. The processor 204 can execute instructions stored in the memory 207 to perform the operations. The processor 204 can include one processing device or multiple processing devices or cores. Non-limiting examples of the processor 204 include a Field-Programmable Gate Array ("FPGA"), an application-specific integrated circuit ("ASIC"), a microprocessor, etc.

The processor 204 can be communicatively coupled to the memory 207 via the bus 206. The non-volatile memory 207 may include any type of memory device that retains stored information when powered off. Non-limiting examples of the memory 207 include EEPROM, flash memory, or any other type of non-volatile memory. In some examples, at least part of the memory 207 can include a medium from which the processor 204 can read instructions. A computer-readable medium can include electronic, optical, magnetic, or other storage devices capable of providing the processor 204 with computer-readable instructions or other program code. Non-limiting examples of a computer-readable medium include (but are not limited to) magnetic disk(s), memory chip(s), ROM, RAM, an ASIC, a configured processor, optical storage, or any other medium from which a computer processor can read instructions. The instructions can include processor-specific instructions generated by a compiler or an interpreter from code written in any suitable computer-programming language, including, for example, C, C++, C #, etc. The memory 207 may include instructions 210 executable by the processor 204 for causing the processor 204 to perform operations described herein. The memory may additionally include a geological database 212 that may include geological features 106 with pre-extracted parameters and associated parameter signatures. The instructions 210 may cause the processor 204 to perform a search of the database 212 for identifying and outputting the analogue geological feature.

The system 200 can include a power source 220. The power source 220 can be in electrical communication with the computing device 104 and the communications device 222. In some examples, the power source 220 can include a battery or an electrical cable (e.g., a wireline). The power source 220 can include an AC signal generator. The computing device 104 can operate the power source 220 to apply a transmission signal to the antenna 228 to forward data relating to the signature of the geological feature of interest, an analogue geological feature, etc. to other systems. For example, the computing device 104 can cause the power source 220 to apply a voltage with a frequency within a specific frequency range to the antenna 228. This can cause the antenna 228 to generate a wireless transmission. In other examples, the computing device 104, rather than the power source 220, can apply the transmission signal to the antenna 228 for generating the wireless transmission.

In some examples, part of the communications device 108 can be implemented in software. For example, the communications device 108 can include additional instructions stored in memory 207 for controlling functions of the communication device 108. The communications device 144 can receive signals from remote devices and transmit data to remote devices. For example, the communications device 108 can transmit wireless communications that are modulated by data via the antenna 228. In some examples, the communications device 108 can receive signals (e.g. associated with data to be transmitted) from the processor 204 and amplify, filter, modulate, frequency shift, or otherwise manipulate the signals. In some examples, the communications device 108 can transmit the manipulated signals to the antenna 228. The antenna 228 can receive the manipulated signals and responsively generate wireless communications that carry the data.

The computing system 200 can receive input from the sensor 110. The computing system 200 in this example also includes input/output interface 232. Input/output interface 232 can connect to a keyboard, pointing device, display, and other computer input/output devices. An operator may provide input using the input/output interface 232. Parameters or signatures from geological features 106 can be displayed to an operator of the exploration operation through a display that is connected to or is part of input/output interface 232. The displayed values can provide an advisory function to the operator, or to a supervisor of the exploration operation, who can make recommendations based on the displayed values.

Figure 3:
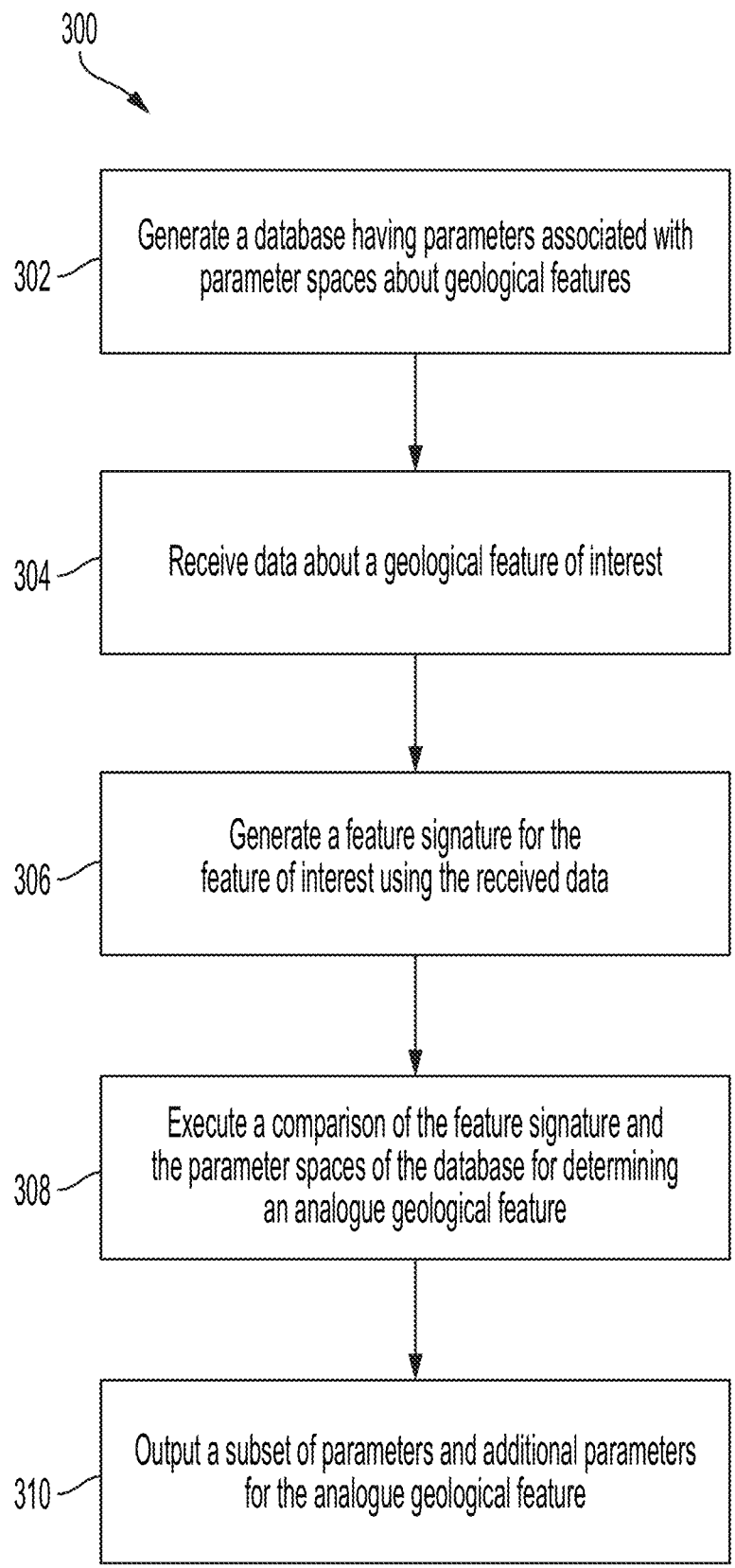
FIG. 3 is a flow chart of a process for outputting an analogue geological feature based on a database search with a signature of a feature of interest according to one example of the present disclosure.

FIG. 3 is a flow chart of a process 300 for outputting an analogue geological feature based on a database search with a signature of a geological feature of interest according to one example of the present disclosure. At block 302, the computing device 104 generates a geological database 212 that includes parameters about a set of geological features 106 associated with a set of parameter signatures. In some examples, the computing device 104 may generate the geological database 212 by extracting a parameter signature for each geological feature 106, based on a geological feature type and a geological time, and a subset of the parameters for each geological feature using signals received by the sensor 110.

At block 304, the computing device 104 receives data about a geological feature of interest. The data may include values for feature-of-interest parameters and a type of feature of the geological feature of interest. The values of feature-of-interest parameters may be determined by the computing device 104 based on input from the sensor 110. The geological feature of interest may be similar or identical to at least one of the geological features 106 included in the geological database 212.

At block 306, the computing device 104 generates a feature signature for the geological feature of interest using the received data. The feature signature may be a parameter space and may include values for a subset of the feature-of-interest parameters. The subset of parameters may be selected by the user or by the computing device 104 based on the type of feature of the geological feature of interest. The feature signature may be used by the computing device 104 to determine the analogue geological feature.

At block 308, the computing device 104 executes a comparison of the feature signature to the parameter signatures within the geological database 212 for identifying the geological feature 106 that is an analogue geological feature of the geological feature of interest. The comparison may involve the computing device 104 directly comparing the feature signature to each parameter signature included in the geological database 212. In some examples, based on the type of feature of the geological feature of interest, the computing device 104 may execute the comparison using a subset of the parameters in the feature signature. The computing device 104 may output more than one analogue geological feature based on the comparison. The analogue geological feature may be selected based on the parameter signature of the analogue geological feature being substantially similar or identical to the feature signature of the geological feature of interest. In some examples, a parameter signature and a feature signature being substantially similar or identical means that the root-mean-square error between the parameter signature and the feature signature is minimized.

At block 310, the computing device 104 outputs a subset of parameters and additional parameters for the analogue geological feature for use in subterranean exploration. In some examples, the computing device 104 may output the subset of parameters and additional parameters for more than one analogue geological feature. The computing device 104 may display information relating to the feature signature and the parameter signatures associated with the geological feature of interest and the analogue geological feature, respectively, on a common plot for viewing by the operator or supervisor of the operation. In some examples, the operator or supervisor of the operation may use the displayed information to model the geological feature of interest for making a recommendation for whether or how to drill a well into the geological feature of interest.

Figure 4:
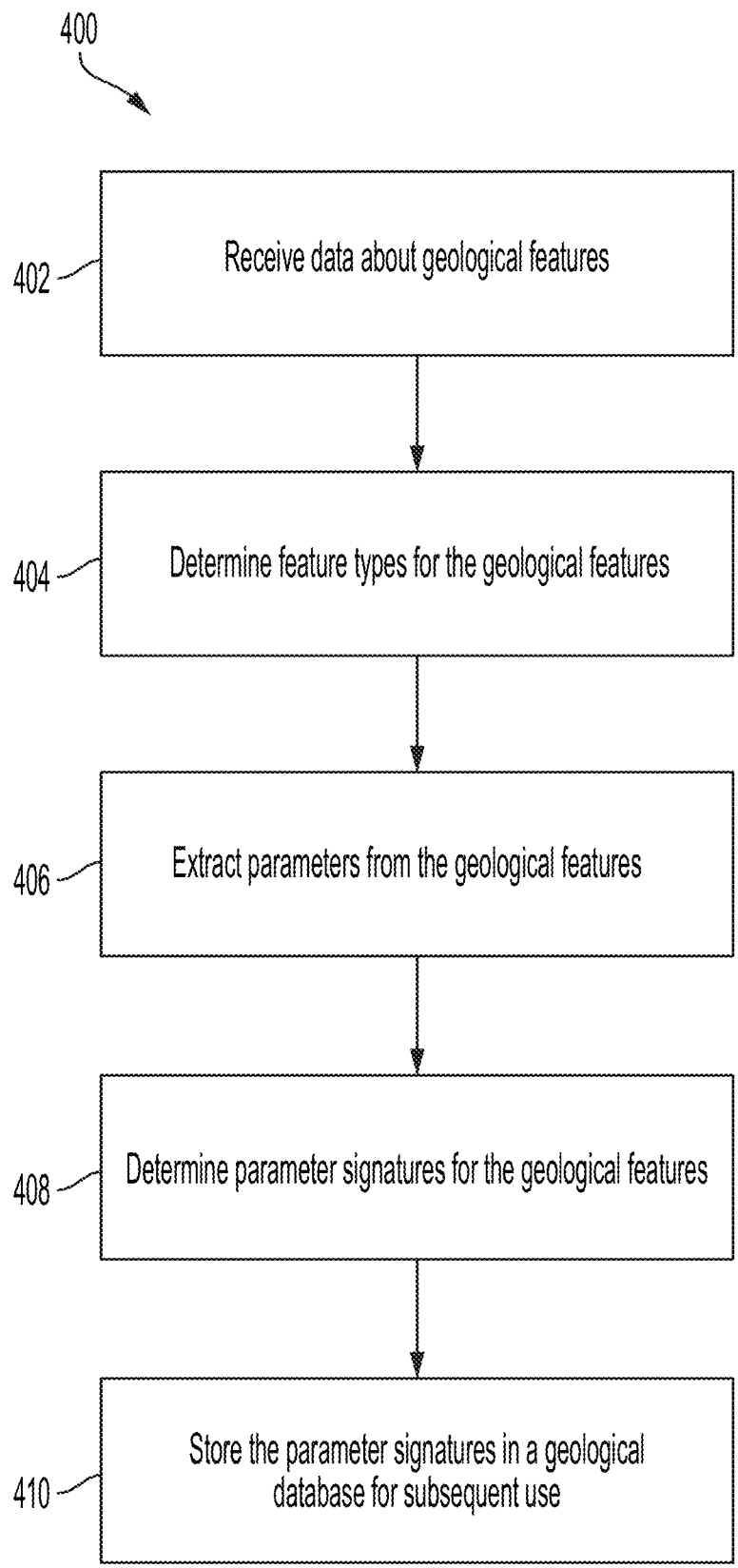
FIG. 4 is a flow chart of a process for generating a database of analogue geological features according to one example of the present disclosure.

FIG. 4 is a flow chart of a process 400 for generating the geological database 212 of geological features 106 according to one example of the present disclosure. At block 402, the computing device 104 receives data about a set of geological features 106. The data may include information relating to a feature type, a feature location, a feature age, and the like about each geological feature 106 of the geological features 106. The information may be received by the computing device 104 from the sensor 110, and in some examples, the computing device 104 may use the information received from the sensor 110 for generating the geological database 212 having the geological features 106.

At block 404, the computing device 104 determines a type of feature for each geological feature 106 of the geological features 106. The information or data received at block 402 may include the type of feature for each geological feature 106 of the geological features 106. The type of feature may include a deltaic reservoir, a carbonate reservoir, regional source rock, and the like. In some examples, the type of feature may influence which parameter values included in the feature signature are used in a search of the geological database 212 by the computing device 104.

At block 406, the computing device 104 extracts parameter values for the geological features 106 based on the received data. The computing device 104 may extract the parameter values for each geological feature 106 based on the received data and the type of feature of the geological feature 106. The extracted parameters may be different for varying types of geological features 106. For example, if a geological feature 106 is located in a subterranean formation 100 that is not under or adjacent to an ocean, the computing device 104 may not extract values for parameters relating to tidal or wave energy. The parameter values may be extracted prior to the computing device 104 executing the search of the geological database 212.

At block 408, the computing device 104 determines a set of parameter signatures for each geological feature 106 of the set of geological features 106. Each parameter signature may be different from other parameter signatures, and, in some examples, each parameter signature may include different types of parameter types. In other examples, some parameter signatures may include similar or identical parameter values, types of parameters, or a combination thereof. The parameter signatures may be determined by the computing device 104 based on the extracted parameters for each geological feature 106. The parameter signatures may be used by the computing device 104 for executing the comparison at block 308 of the process 300.

At block 410, the computing device 104 stores the determined parameter signatures for each geological feature 106 in the geological database 212 for subsequent use. Subsequent to determining the parameter signatures, the computing device 104 may store the parameter signatures in the geological database 212 for subsequent use in determining the analogue geological feature. The geological database 212 may be used by the computing device 104 to output the subset of parameters and additional parameters at block 310 of the process 300.

Figure 5:
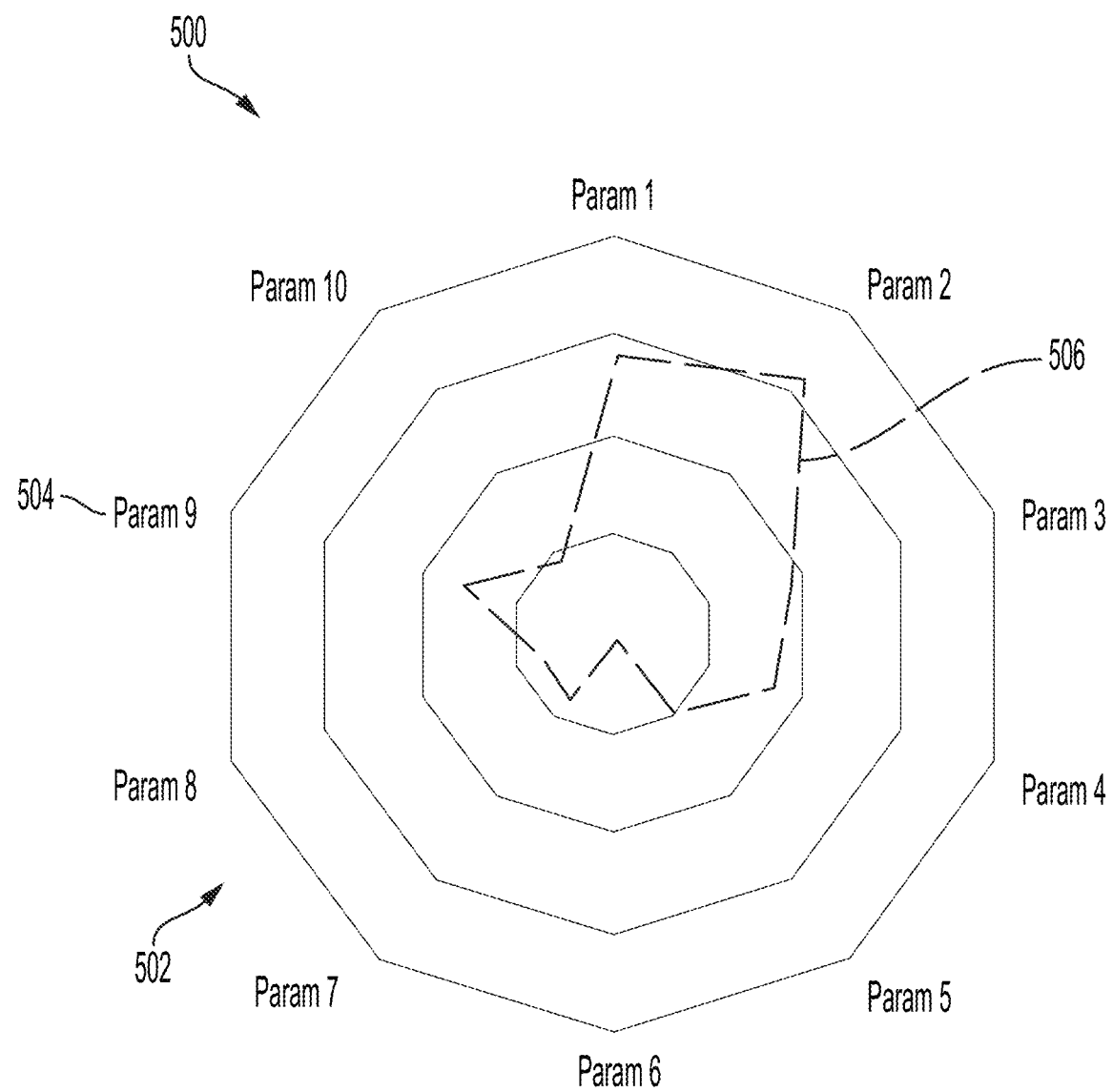
FIG. 5 is an example of a signature associated with a geological feature of interest according to one example of the present disclosure.

FIG. 5 is an example of a signature 500 associated with a geological feature of interest according to one example of the present disclosure. The signature 500, in FIG. 5, is illustrated on a signature plot 502 that includes a set of parameters 504, and the signature 500 may be associated with a geological feature 106. The geological feature 106 may be a geological feature of interest, an analogue geological feature, included in the geological database 212 generated by the process 400, or a combination thereof. The signature plot 502 includes ten different parameters 504, but other suitable numbers of parameters 504 may be used depending on the type of geological feature 106. The parameters 504 to be displayed on the signature plot 502 may be determined by the computing device 104 in response to determining the type of geological feature 106.

A graph 506 of the parameters 504 may be included on the signature plot 502. The graph 506 can be displayed by the computing device 104 for viewing by the operator or supervisor of an exploration operation for conveying to the operator or supervisor values of the parameters 504. In some examples, the graph 506 may be of a circular shape and may include ten values that correspond to the ten illustrated parameters 504. For each parameter 504, a higher value may cause the graph 506 to display the higher value at a larger radius compared to a lower value. The graph 506 may be used to compare the signature 500 to other signatures that may include a feature signature, parameter signatures, or a combination thereof.

Figure 6:
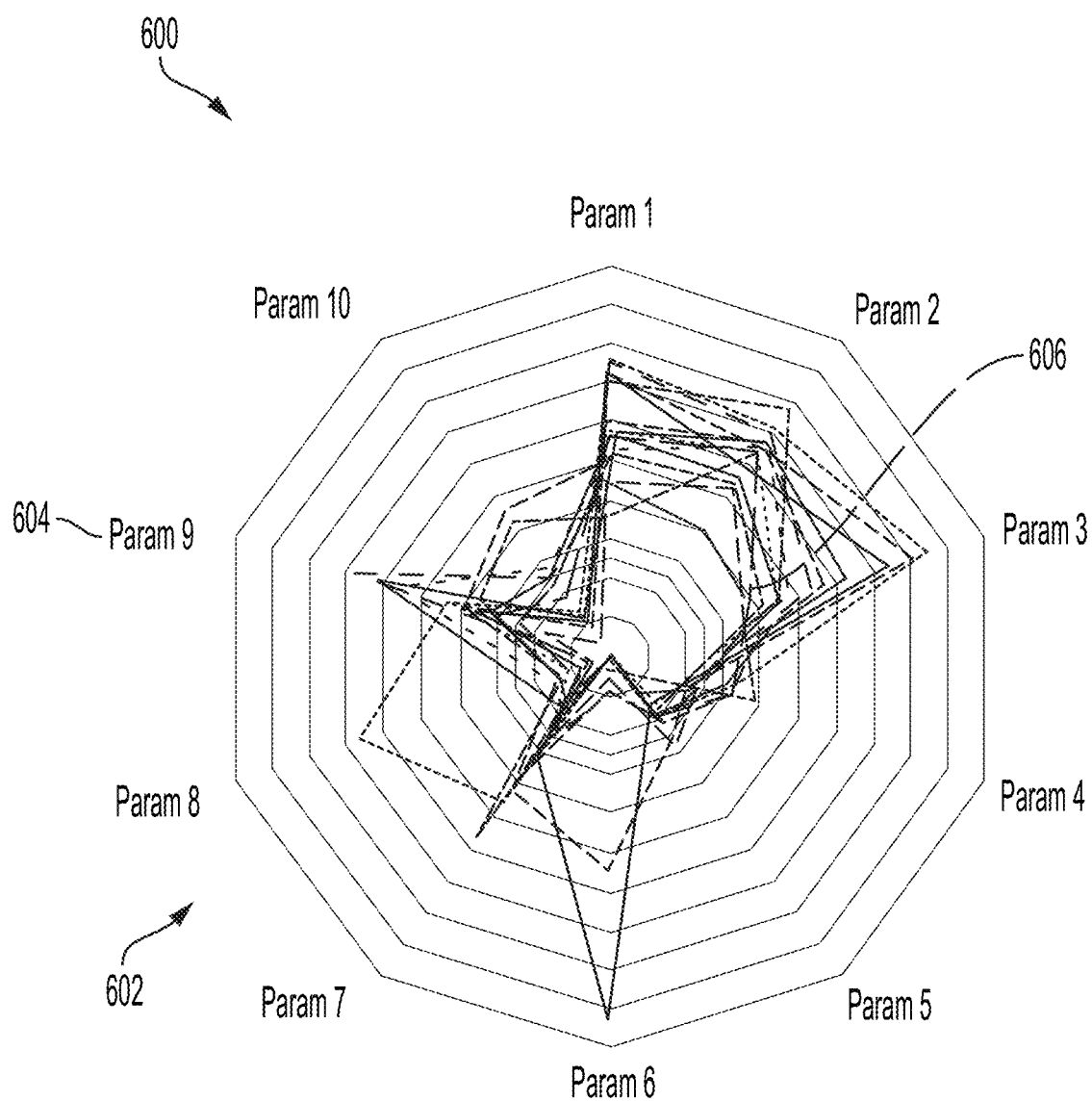
FIG. 6 is an example of a plot including a signature for a geological feature of interest and a set of signatures, each signature of the set of signatures corresponding to a different analogue geological feature according to one example of the present disclosure.

FIG. 6 is an example of a set 600 of signatures including a feature signature for a geological feature of interest and a set of signatures, each signature of the set of signatures corresponding to a different geological features 106 included in the geological database 212 according to one example of the present disclosure. Similar to FIG. 5, the set 600 of signatures may include a signature plot 602 that includes a set of parameters 604, and the set 600 of signatures may be associated with geological features 106. The geological features 106 may include a geological feature of interest, an analogue geological feature, included in the geological database 212 generated by the process 400, or a combination thereof. The signature plot 602, as illustrated in FIG. 6, includes ten different parameters 604, but other suitable numbers of parameters 604 may be used depending on the type of geological feature 106. The parameters 604 to be displayed on the signature plot 602 may be determined by the computing device 104 in response to determining the type of geological feature 106.

A graph 606 of the parameters 604 may be included on the signature plot 602. The graph 606 can be displayed by the computing device 104 for viewing by the operator or supervisor of an exploration operation for conveying to the operator or supervisor values of the parameters 604 for each signature of the set 600 of signatures. In some examples, the graph 606 may be of a circular shape and may include ten values that correspond to the ten illustrated parameters 604. For each parameter 604, a higher value may cause the graph 606 to display the higher value at a larger radius compared to a lower value. The graph 606 may be used by the operator, the supervisor, or the computing device 104 to compare the set 600 of signatures.

The set 600 of signatures may be used by the computing device 104 to execute the comparison described with respect to the block 308 of the process 300. The computing device 104 may determine which signatures included in the geological database 212 to display on the signature plot 602 based on the search of the geological database 212. The set 600 of signatures, as illustrated in FIG. 6, include more than ten signatures, but other suitable number of signatures may be included for executing the comparison. In executing the comparison, the computing device 104 may compare the feature signature to the remaining signatures of the set 600 of signatures for identifying or otherwise determining the analogue geological feature for output. The comparison may be executed in response to the computing device 104 searching the geological database 212 using a subset of parameters of the geological feature of interest.

Figure 7:
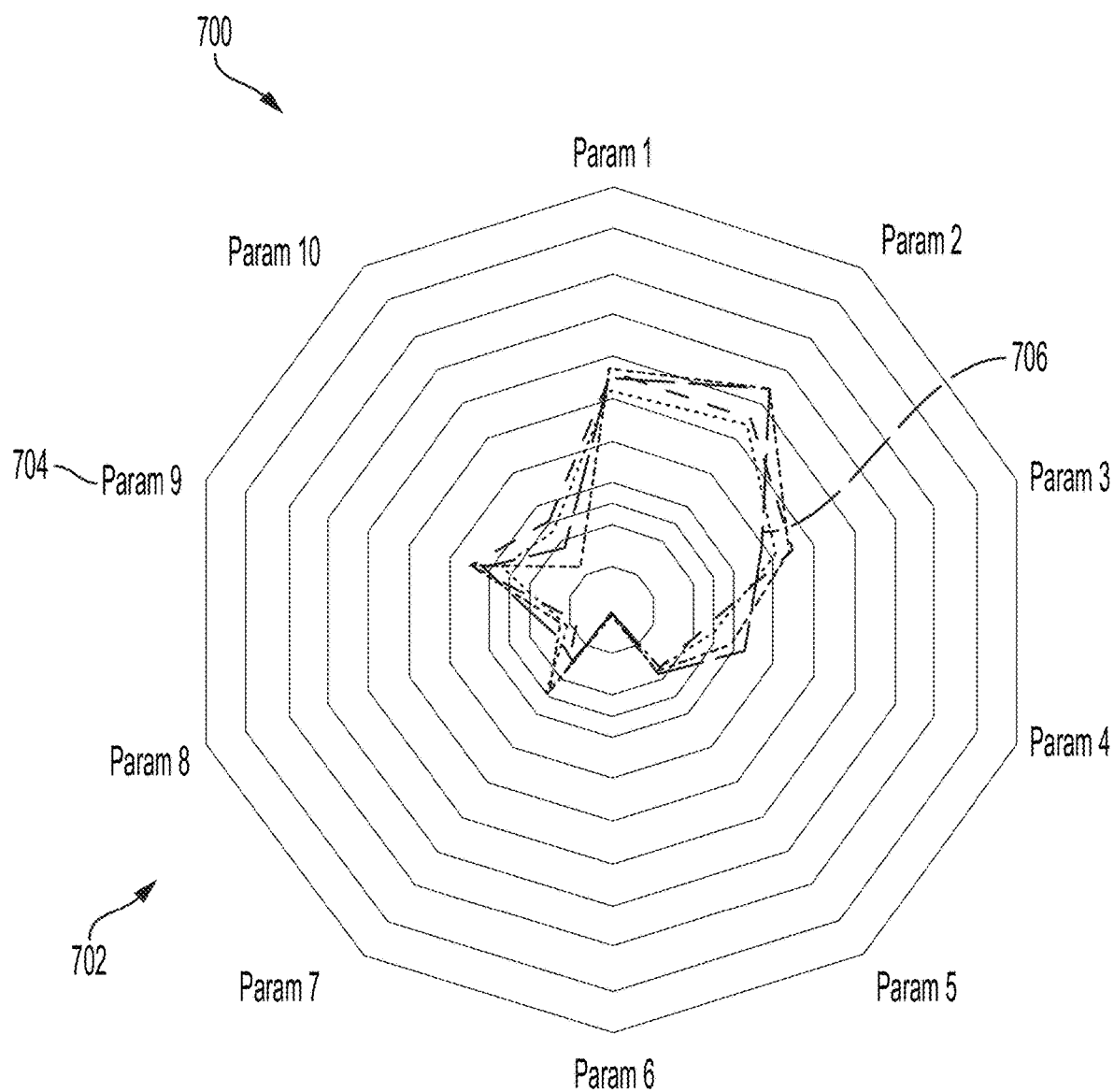
FIG. 7 is an example of an output from an analogue geological feature database search using a subset of parameters of a geological feature of interest according to one example of the present disclosure.

FIG. 7 is an example of an output 700 from the search of the geological database 212 using a subset of parameters of a geological feature of interest according to one example of the present disclosure. The output 700, as illustrated in FIG. 7, includes a signature plot 702 that includes a set of parameters 704, and the output 700 may be associated with the analogue geological feature. The analogue geological feature may include a parameter signature that is similar or identical to the feature signature of the geological feature of interest. The signature plot 702 includes ten different parameters 704, but other suitable numbers of parameters 704 may be used depending on the type of the geological feature of interest. The parameters 704 to be displayed on the signature plot 702 may be determined by the computing device 104 in response to determining the type of the geological feature of interest. The computing device 104 may determine the subset of parameters to use as an input for the search of the geological database 212 using the feature signature based on the type of the geological feature of interest. The computing device 104 may identify or otherwise determine the analogue geological feature based on the executed comparison described with respect to block 308 of the process 300.

A graph 706 of the parameters 704 may be included on the signature plot 702. The graph 706 can be displayed by the computing device 104 for viewing by the operator or supervisor of an exploration operation for conveying to the operator or supervisor values of the parameters 704 associated with at least one analogue geological feature. In some examples, the graph 706 may be of a circular shape and may include ten values that correspond to the ten illustrated parameters 704. For each parameter 704, a higher value may cause the graph 706 to display the higher value at a larger radius compared to a lower value. The graph 706 may be used to display a result of the geological database 212 search and comparison executed by the computing device 104.

In some aspects, systems, methods, and non-transitory computer-readable mediums for performing a search of a geological database for determining an analogue geological feature are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a system comprising: a processor; and a non-transitory computer-readable medium comprising instructions that are executable by the processor to cause the processor to perform operations comprising: generating a database to include parameters about a plurality of geological features associated with a plurality of parameter signatures by extracting a parameter signature for each respective geological feature, based on a geological feature type, a geological time, and a subset of the parameters for the respective geological feature; receiving data about a geological feature of interest, the data including values for feature-of-interest parameters and a type of feature of the geological feature of interest; generating a feature signature for the geological feature of interest using the data, the feature signature including values for a subset of the feature-of-interest parameters selected based on the type of feature of the geological feature of interest; executing a comparison of the feature signature to the plurality of parameter signatures on the database to identify the geological feature that is an analogue geological feature for the geological feature of interest; and outputting a subset of parameters and additional parameters for the analogue geological feature for use in subterranean exploration.

Example 2 is the system of example 1, wherein the operation of generating a database to include parameters about a plurality of geological features associated with a plurality of parameter signatures by extracting a parameter signature for each respective geological feature, a geological time, and a subset of the parameters for the respective geological feature includes: receiving data about the plurality of geological features including a geological time of each geological feature, a feature type of each geological feature, and a location of each geological feature; determining the feature type for each geological feature of the plurality of geological features based on the received data; extracting values of parameters for each geological feature of the plurality of geological features based on the received data and the feature type for each geological feature of the plurality of geological features; extracting parameter signatures based on the extracted values of parameters by compiling extracted values of parameters that are relevant to the feature type of each geological feature of the plurality of geological features into the extracted parameter signatures; and generating the database by storing the extracted parameter signatures in the database for subsequent use in exploration operations, the database configured to receive a subset of values of feature-of-interest parameters as an input for a search of the database.

Example 3 is the system of example 1, wherein the operation of executing a comparison of the feature signature to the plurality of parameter signatures on the database to identify the geological feature that is an analogue geological feature for the geological feature of interest includes comparing each parameter signature of the plurality of parameter signatures to the feature signature for determining the analogue geological feature, the analogue geological feature having the parameter signature with a minimum root-mean-square error value compared with the feature signature.

Example 4 is the system of example 1, wherein the operation of executing a comparison of the feature signature to the plurality of parameter signatures on the database to identify the geological feature that is an analogue geological feature for the geological feature of interest includes using a predefined grid for identifying the analogue geological feature.

Example 5 is the system of example 1, wherein a geological feature type includes a deltaic reservoir, a carbonate reservoir, regional source rock, a subterranean reservoir, and a rock basin, wherein the feature-of-interest parameters include tidal energy, wave energy, eustatic changes, subsidence rates, climate, and temporal changes, and wherein the feature-of-interest parameters are determined by a feature type of the geological feature of interest.

Example 6 is the system of example 1, wherein the operation of outputting a subset of parameters and additional parameters for the analogue geological feature for use in subterranean exploration includes outputting a plurality of subsets of parameters and a plurality of additional parameters for a plurality of geological features, and wherein the analogue geological feature is selected from the plurality of geological features based on the plurality of subsets of parameters and the plurality of additional parameters.

Example 7 is the system of example 1, wherein the operation of executing a comparison of the feature signature to the plurality of parameter signatures on the database to identify the geological feature that is an analogue geological feature for the geological feature of interest includes reconstructing a palinspastic position of the geological feature of interest for comparing the feature signature to each parameter signature of the plurality of parameter signatures.

Example 8 is a method comprising: generating a database to include parameters about a plurality of geological features associated with a plurality of parameter signatures by extracting a parameter signature for each respective geological feature, based on a geological feature type, a geological time, and a subset of the parameters for the respective geological feature; receiving data about a geological feature of interest, the data including values for feature-of-interest parameters and a type of feature of the geological feature of interest; generating a feature signature for the geological feature of interest using the data, the feature signature including values for a subset of the feature-of-interest parameters selected based on the type of feature of the geological feature of interest; executing a comparison of the feature signature to the plurality of parameter signatures on the database to identify the geological feature that is an analogue geological feature for the geological feature of interest; and outputting a subset of parameters and additional parameters for the analogue geological feature for use in subterranean exploration.

Example 9 is the method of example 8, wherein generating a database to include parameters about a plurality of geological features associated with a plurality of parameter signatures by extracting a parameter signature for each respective geological feature, a geological time, and a subset of the parameters for the respective geological feature includes: receiving data about the plurality of geological features including a geological time of each geological feature, a feature type of each geological feature, and a location of each geological feature; determining the feature type for each geological feature of the plurality of geological features based on the received data; extracting values of parameters for each geological feature of the plurality of geological features based on the received data and the feature type for each geological feature of the plurality of geological features; extracting parameter signatures based on the extracted values of parameters by compiling extracted values of parameters that are relevant to the feature type of each geological feature of the plurality of geological features into the extracted parameter signatures; and generating the database by storing the extracted parameter signatures in the database for subsequent use in exploration operations, the database configured to receive a subset of values of feature-of-interest parameters as an input for a search of the database.

Example 10 is the method of example 8, wherein executing a comparison of the feature signature to the plurality of parameter signatures on the database to identify the geological feature that is an analogue geological feature for the geological feature of interest includes comparing each parameter signature of the plurality of parameter signatures to the feature signature for determining the analogue geological feature, the analogue geological feature having the parameter signature with a minimum root-mean-square error value compared with the feature signature.

Example 11 is the method of example 8, wherein executing a comparison of the feature signature to the plurality of parameter signatures on the database to identify the geological feature that is an analogue geological feature for the geological feature of interest includes using a predefined grid for identifying the analogue geological feature.

Example 12 is the method of example 8, wherein a geological feature type includes a deltaic reservoir, a carbonate reservoir, regional source rock, a subterranean reservoir, and a rock basin, wherein the feature-of-interest parameters include tidal energy, wave energy, eustatic changes, subsidence rates, climate, and temporal changes, and wherein the feature-of-interest parameters are determined by a feature type of the geological feature of interest.

Example 13 is the method of example 8, wherein outputting a subset of parameters and additional parameters for the analogue geological feature for use in subterranean exploration includes outputting a plurality of subsets of parameters and a plurality of additional parameters for a plurality of geological features, and wherein the analogue geological feature is selected from the plurality of geological features based on the plurality of subsets of parameters and the plurality of additional parameters.

Example 14 is the method of example 8, wherein executing a comparison of the feature signature to the plurality of parameter signatures on the database to identify the geological feature that is an analogue geological feature for the geological feature of interest includes reconstructing a palinspastic position of the geological feature of interest for comparing the feature signature to each parameter signature of the plurality of parameter signatures.

Example 15 is a non-transitory computer-readable medium comprising instructions that are executable by a processing device for causing the processing device to perform operations comprising: generating a database to include parameters about a plurality of geological features associated with a plurality of parameter signatures by extracting a parameter signature for each respective geological feature, based on a geological feature type, a geological time, and a subset of the parameters for the respective geological feature; receiving data about a geological feature of interest, the data including values for feature-of-interest parameters and a type of feature of the geological feature of interest; generating a feature signature for the geological feature of interest using the data, the feature signature including values for a subset of the feature-of-interest parameters selected based on the type of feature of the geological feature of interest; executing a comparison of the feature signature to the plurality of parameter signatures on the database to identify the geological feature that is an analogue geological feature for the geological feature of interest; and outputting a subset of parameters and additional parameters for the analogue geological feature for use in subterranean exploration.

Example 16 is the non-transitory computer-readable medium of example 15, wherein the operation of generating a database to include parameters about a plurality of geological features associated with a plurality of parameter signatures by extracting a parameter signature for each respective geological feature, a geological time, and a subset of the parameters for the respective geological feature includes: receiving data about the plurality of geological features including a geological time of each geological feature, a feature type of each geological feature, and a location of each geological feature; determining the feature type for each geological feature of the plurality of geological features based on the received data; extracting values of parameters for each geological feature of the plurality of geological features based on the received data and the feature type for each geological feature of the plurality of geological features; extracting parameter signatures based on the extracted values of parameters by compiling extracted values of parameters that are relevant to the feature type of each geological feature of the plurality of geological features into the extracted parameter signatures; and generating the database by storing the extracted parameter signatures in the database for subsequent use in exploration operations, the database configured to receive a subset of values of feature-of-interest parameters as an input for a search of the database.

Example 17 is the non-transitory computer-readable medium of example 15, wherein the operation of executing a comparison of the feature signature to the plurality of parameter signatures on the database to identify the geological feature that is an analogue geological feature for the geological feature of interest includes comparing each parameter signature of the plurality of parameter signatures to the feature signature for determining the analogue geological feature, the analogue geological feature having the parameter signature with a minimum root-mean-square error value compared with the feature signature.

Example 18 is the non-transitory computer-readable medium of example 15, wherein a geological feature type includes a deltaic reservoir, a carbonate reservoir, regional source rock, a subterranean reservoir, and a rock basin, wherein the feature-of-interest parameters include tidal energy, wave energy, eustatic changes, subsidence rates, climate, and temporal changes, and wherein the feature-of-interest parameters are determined by a feature type of the geological feature of interest.

Example 19 is the non-transitory computer-readable medium of example 15, wherein the operation of outputting a subset of parameters and additional parameters for the analogue geological feature for use in subterranean exploration includes outputting a plurality of subsets of parameters and a plurality of additional parameters for a plurality of geological features, and wherein the analogue geological feature is selected from the plurality of geological features based on the plurality of subsets of parameters and the plurality of additional parameters.

Example 20 is the non-transitory computer-readable medium of example 15, wherein the operation of executing a comparison of the feature signature to the plurality of parameter signatures on the database to identify the geological feature that is an analogue geological feature for the geological feature of interest includes reconstructing a palinspastic position of the geological feature of interest for comparing the feature signature to each parameter signature of the plurality of parameter signatures.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:
1. A system comprising:
a processor; and
a non-transitory computer-readable medium comprising instructions that are executable by the processor to cause the processor to perform operations comprising:
generating a database to include parameters about a plurality of geological features associated with a plurality of parameter signatures by extracting a parameter signature for each respective geological feature, based on a geological feature type, a geo- logical time, and a subset of the parameters for the respective geological feature;

receiving data about a geological feature of interest, the data including values for feature-of-interest parameters and a type of feature of the geological feature of interest;

generating a feature signature for the geological feature of interest using the data, the feature signature including values for a subset of the feature-of-interest parameters selected based on the type of feature of the geological feature of interest;

executing a comparison of the feature signature to the plurality of parameter signatures on the database to identify the geological feature that is an analogue geological feature for the geological feature of interest; and outputting a subset of parameters and additional parameters for the analogue geological feature for use in subterranean exploration.

2. The system of claim 1, wherein the operation of generating a database to include parameters about a plurality of geological features associated with a plurality of parameter signatures by extracting a parameter signature for each respective geological feature, a geological time, and a subset of the parameters for the respective geological feature includes:

receiving data about the plurality of geological features including a geological time of each geological feature, a feature type of each geological feature, and a location of each geological feature;

determining the feature type for each geological feature of the plurality of geological features based on the received data;

extracting values of parameters for each geological feature of the plurality of geological features based on the received data and the feature type for each geological feature of the plurality of geological features;

extracting parameter signatures based on the extracted values of parameters by compiling extracted values of parameters that are relevant to the feature type of each geological feature of the plurality of geological features into the extracted parameter signatures; and generating the database by storing the extracted parameter signatures in the database for subsequent use in exploration operations, the database configured to receive a subset of values of feature-of-interest parameters as an input for a search of the database.

3. The system of claim 1, wherein the operation of executing a comparison of the feature signature to the plurality of parameter signatures on the database to identify the geological feature that is an analogue geological feature for the geological feature of interest includes comparing each parameter signature of the plurality of parameter signatures to the feature signature for determining the analogue geological feature, the analogue geological feature having the parameter signature with a minimum root-mean-square error value compared with the feature signature.

4. The system of claim 1, wherein the operation of executing a comparison of the feature signature to the plurality of parameter signatures on the database to identify the geological feature that is an analogue geological feature for the geological feature of interest includes using a predefined grid for identifying the analogue geological feature.

5. The system of claim 1, wherein a geological feature type includes a deltaic reservoir, a carbonate reservoir, regional source rock, a subterranean reservoir, and a rock basin, wherein the feature-of-interest parameters include tidal energy, wave energy, eustatic changes, subsidence rates, climate, and temporal changes, and wherein the feature-of-interest parameters are determined by a feature type of the geological feature of interest.

6. The system of claim 1, wherein the operation of outputting a subset of parameters and additional parameters for the analogue geological feature for use in subterranean exploration includes outputting a plurality of subsets of parameters and a plurality of additional parameters for a plurality of geological features, and wherein the analogue geological feature is selected from the plurality of geological features based on the plurality of subsets of parameters and the plurality of additional parameters.

7. The system of claim 1, wherein the operation of executing a comparison of the feature signature to the plurality of parameter signatures on the database to identify the geological feature that is an analogue geological feature for the geological feature of interest includes reconstructing a palinspastic position of the geological feature of interest for comparing the feature signature to each parameter signature of the plurality of parameter signatures.

8. A method comprising:

generating a database to include parameters about a plurality of geological features associated with a plurality of parameter signatures by extracting a parameter signature for each respective geological feature, based on a geological feature type, a geological time, and a subset of the parameters for the respective geological feature;

receiving data about a geological feature of interest, the data including values for feature-of-interest parameters and a type of feature of the geological feature of interest;

generating a feature signature for the geological feature of interest using the data, the feature signature including values for a subset of the feature-of-interest parameters selected based on the type of feature of the geological feature of interest;

executing a comparison of the feature signature to the plurality of parameter signatures on the database to identify the geological feature that is an analogue geological feature for the geological feature of interest; and outputting a subset of parameters and additional parameters for the analogue geological feature for use in subterranean exploration.

9. The method of claim 8, wherein generating a database to include parameters about a plurality of geological features associated with a plurality of parameter signatures by extracting a parameter signature for each respective geological feature, a geological time, and a subset of the parameters for the respective geological feature includes:

receiving data about the plurality of geological features including a geological time of each geological feature, a feature type of each geological feature, and a location of each geological feature;

determining the feature type for each geological feature of the plurality of geological features based on the received data;

extracting values of parameters for each geological feature of the plurality of geological features based on the received data and the feature type for each geological feature of the plurality of geological features;

extracting parameter signatures based on the extracted values of parameters by compiling extracted values of parameters that are relevant to the feature type of each geological feature of the plurality of geological features into the extracted parameter signatures; and generating the database by storing the extracted parameter signatures in the database for subsequent use in exploration operations, the database configured to receive a subset of values of feature-of-interest parameters as an input for a search of the database.

10. The method of claim 8, wherein executing a comparison of the feature signature to the plurality of parameter signatures on the database to identify the geological feature that is an analogue geological feature for the geological feature of interest includes comparing each parameter signature of the plurality of parameter signatures to the feature signature for determining the analogue geological feature, the analogue geological feature having the parameter signature with a minimum root-mean-square error value compared with the feature signature.

11. The method of claim 8, wherein executing a comparison of the feature signature to the plurality of parameter signatures on the database to identify the geological feature that is an analogue geological feature for the geological feature of interest includes using a predefined grid for identifying the analogue geological feature.

12. The method of claim 8, wherein a geological feature type includes a deltaic reservoir, a carbonate reservoir, regional source rock, a subterranean reservoir, and a rock basin, wherein the feature-of-interest parameters include tidal energy, wave energy, eustatic changes, subsidence rates, climate, and temporal changes, and wherein the feature-of-interest parameters are determined by a feature type of the geological feature of interest.

13. The method of claim 8, wherein outputting a subset of parameters and additional parameters for the analogue geological feature for use in subterranean exploration includes outputting a plurality of subsets of parameters and a plurality of additional parameters for a plurality of geological features, and wherein the analogue geological feature is selected from the plurality of geological features based on the plurality of subsets of parameters and the plurality of additional parameters.

14. The method of claim 8, wherein executing a comparison of the feature signature to the plurality of parameter signatures on the database to identify the geological feature that is an analogue geological feature for the geological feature of interest includes reconstructing a palinspastic position of the geological feature of interest for comparing the feature signature to each parameter signature of the plurality of parameter signatures.

15. A non-transitory computer-readable medium comprising instructions that are executable by a processing device for causing the processing device to perform operations comprising:
    generating a database to include parameters about a plurality of geological features associated with a plurality of parameter signatures by extracting a parameter signature for each respective geological feature, based on a geological feature type, a geological time, and a subset of the parameters for the respective geological feature;
    receiving data about a geological feature of interest, the data including values for feature-of-interest parameters and a type of feature of the geological feature of interest;
    generating a feature signature for the geological feature of interest using the data, the feature signature including values for a subset of the feature-of-interest parameters selected based on the type of feature of the geological feature of interest;
    executing a comparison of the feature signature to the plurality of parameter signatures on the database to identify the geological feature that is an analogue geological feature for the geological feature of interest; and
    outputting a subset of parameters and additional parameters for the analogue geological feature for use in subterranean exploration.

16. The non-transitory computer-readable medium of claim 15, wherein the operation of generating a database to include parameters about a plurality of geological features associated with a plurality of parameter signatures by extracting a parameter signature for each respective geological feature, a geological time, and a subset of the parameters for the respective geological feature includes:
    receiving data about the plurality of geological features including a geological time of each geological feature, a feature type of each geological feature, and a location of each geological feature;
    determining the feature type for each geological feature of the plurality of geological features based on the received data;
    extracting values of parameters for each geological feature of the plurality of geological features based on the received data and the feature type for each geological feature of the plurality of geological features;
    extracting parameter signatures based on the extracted values of parameters by compiling extracted values of parameters that are relevant to the feature type of each geological feature of the plurality of geological features into the extracted parameter signatures; and
generating the database by storing the extracted parameter signatures in the database for subsequent use in exploration operations, the database configured to receive a subset of values of feature-of-interest parameters as an input for a search of the database.

17. The non-transitory computer-readable medium of claim 15, wherein the operation of executing a comparison of the feature signature to the plurality of parameter signatures on the database to identify the geological feature that is an analogue geological feature for the geological feature of interest includes comparing each parameter signature of the plurality of parameter signatures to the feature signature for determining the analogue geological feature, the analogue geological feature having the parameter signature with a minimum root-mean-square error value compared with the feature signature.

18. The non-transitory computer-readable medium of claim 15, wherein a geological feature type includes a deltaic reservoir, a carbonate reservoir, regional source rock, a subterranean reservoir, and a rock basin, wherein the feature-of-interest parameters include tidal energy, wave energy, eustatic changes, subsidence rates, climate, and temporal changes, and wherein the feature-of-interest parameters are determined by a feature type of the geological feature of interest.

19. The non-transitory computer-readable medium of claim 15, wherein the operation of outputting a subset of parameters and additional parameters for the analogue geological feature for use in subterranean exploration includes outputting a plurality of subsets of parameters and a plurality of additional parameters for a plurality of geological features, and wherein the analogue geological feature is selected from the plurality of geological features based on the plurality of subsets of parameters and the plurality of additional parameters.

20. The non-transitory computer-readable medium of claim 15, wherein the operation of executing a comparison of the feature signature to the plurality of parameter signatures on the database to identify the geological feature that is an analogue geological feature for the geological feature of interest includes reconstructing a palinspastic position of the geological feature of interest for comparing the feature signature to each parameter signature of the plurality of parameter signatures.

* * * * *